(12) United States Patent
Devoe et al.

(10) Patent No.: US 6,831,824 B1
(45) Date of Patent: Dec. 14, 2004

(54) SURFACE MOUNTABLE VERTICAL MULTI-LAYER CAPACITOR

(76) Inventors: Lambert Devoe, 3446 Stadium Pl., San Diego, CA (US) 92122; Alan Devoe, 5715 Waverly Ave., La Jolla, CA (US) 92037

( * ) Notice: Subject to any disclaimer, the term of this patent is extended or adjusted under 35 U.S.C. 154(b) by 0 days.

(21) Appl. No.: 10/704,889

(22) Filed: Nov. 10, 2003

(51) Int. Cl.$^7$ .............................................. H01G 4/228
(52) U.S. Cl. ........................ 361/306.1; 361/306.3; 361/303; 361/311; 361/313; 361/321.1
(58) Field of Search ...................... 361/306.1, 306.2, 361/306.3, 303, 305, 308.1, 311, 312, 313, 321.1, 321.2, 321.5, 301.1, 320

(56) References Cited

U.S. PATENT DOCUMENTS

| | | | |
|---|---|---|---|
| 4,661,884 A | 4/1987 | Seaman | 361/306 |
| 4,931,899 A | 6/1990 | Pruett | 361/308 |
| 6,418,009 B1 | 7/2002 | Brunette | 361/306.3 |
| 6,587,327 B1 | 7/2003 | Devoe et al. | 361/306.3 |

*Primary Examiner*—Dean A. Reichard
*Assistant Examiner*—Nguyen T. Ha
(74) *Attorney, Agent, or Firm*—Wood, Herron & Evans, LLP (57) ABSTRACT

A fully surface mountable vertical multi-layer capacitor having low insertion loss at high frequency and low inductance, and providing sufficiently high capacitance for use in broadband and other applications. The capacitor includes a first section and a second section, each directly mountable to a surface trace on a printed circuit board, and each providing an electron flow path to a respective set of internal electrode plates. By the present invention, the need for wire bonding of vertical multi-layer capacitors is eliminated.

35 Claims, 4 Drawing Sheets

SURFACE MOUNTABLE VERTICAL MULTI-LAYER CAPACITOR

FIELD OF THE INVENTION

This invention relates to surface mountable capacitors for high frequency applications, such as broadband applications.

BACKGROUND OF THE INVENTION

Broadband applications require capacitor devices that operate from low frequency. To enable such operation, the capacitor devices require a large capacitor value on the order of 10,000 pF–100,000 pF, if possible. Also important for frequency applications is a low insertion loss and low inductance. Typically, capacitor design is a compromise between the high capacitance value and low inductance and insertion loss.

Figure 1:
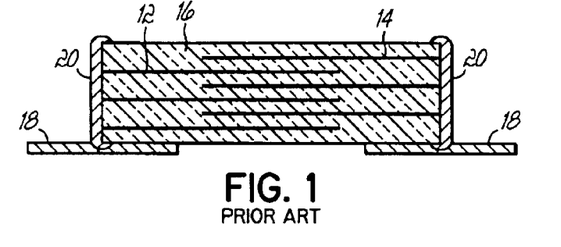
FIG. 1 is a cross-sectional side view of a surface mountable horizontal multi-layer capacitor of the prior art.
Figure 2:
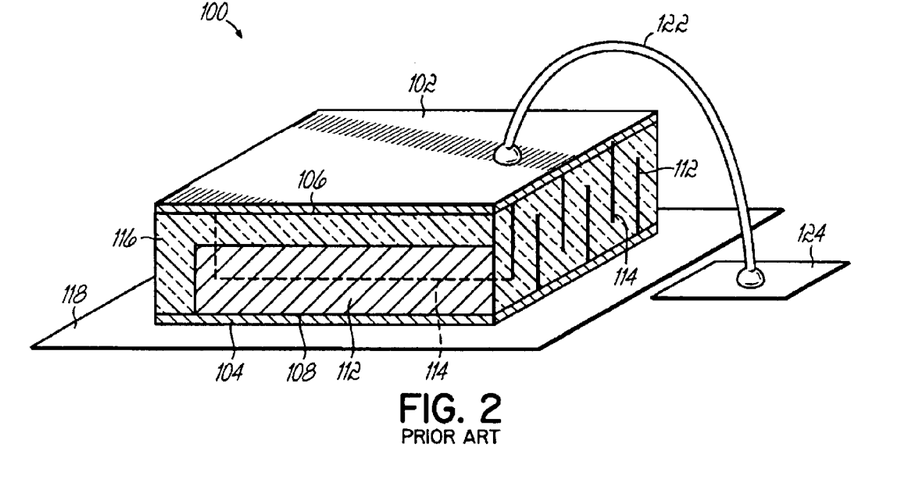
FIG. 2 is a double cross-sectional perspective view of a wire bonded vertical multi-layer capacitor of the prior art.

The multi-layer capacitor 10 depicted in FIG. 1 is well known in the art and includes a plurality of first and second interior electrode plates 12, 14 within a dielectric body 16. Such structures may be formed by printing metallizations on green ceramic layers, stacking the layers, and then cofiring the layered structure to form body 16 with interior electrode plates 12, 14. End conductors 20 may then be formed on opposing ends of body 16 by dipping the body 16 into a conductive paste, by printing or any other suitable method. Capacitor 10 has the benefit of being surface mountable to the circuit board traces 18. The electrons flow from the traces 18 through the end conductors 20 into respective electrode plates 12, 14. A known alternative to the capacitor 10 of FIG. 1 is the vertical multi-layer capacitor 100 shown in FIG. 2, which exhibits better performance properties at high frequencies than the horizontal multi-layer capacitor of FIG. 1. Capacitor 100 includes top and bottom metallizations 102, 104 on opposing planar surfaces 106, 108 of dielectric body 116 and a plurality of alternating first and second interior electrode plates 112, 114 aligned vertically with respect to the trace 118 on the printed circuit board, and substantially perpendicular to the top and bottom metallizations 102, 104. The body 116 with internal electrode plates 112, 114 may be manufactured by a same or similar method as that used for capacitor 10 of FIG. 1. The metallizations are printed on to the surfaces 106, 108. Unlike capacitor 10, capacitor 100 of FIG. 2 is not fully surface mountable, which is a disadvantage with respect to ease of assembly of the capacitor 100 onto a circuit board. Rather, capacitor 100 requires a wire bond 122 for electrically connecting the top metallization 102 to a second trace 124 on the printed circuit board. Wire bonding includes making solder connections between the wire 122 and the top metallization 102 and between the wire 122 and the trace 124. Given the miniaturized dimensions of the components, wire bonding is an intricate process. While the vertical multi-layer capacitor 100 mounted on a trace 118 and wire bonded to a trace 124 has good performance properties at high frequencies, from a manufacturing and assembly perspective, there is a need to develop capacitors that are completely surface mountable.

SUMMARY OF THE INVENTION

The present invention provides a fully surface mountable vertical multi-layer capacitor. The capacitor has low insertion loss at high frequency and low inductance, while providing sufficiently high capacitance for use in broadband and other applications. In an exemplary embodiment of the present invention, the capacitor includes a first section comprising a ceramic dielectric material body having top and bottom opposite exterior surfaces and respective top and bottom metallization areas on those surfaces. The bottom metallization area is adapted to be surface mounted to a trace on a printed circuit board. Within the ceramic dielectric material is a plurality of alternating first and second interior electrode plates that extend between the exterior surfaces. The first electrode plates are in electrical contact with the bottom metallization area and are electrically insulated from the top metallization area. The second electrode plates are in electrical contact with the top metallization area and electrically insulated from the bottom metallization area. In this embodiment, the capacitor further includes a second section in which the body has top and bottom opposite exterior surfaces, and respective top and bottom metal surface portions. The bottom metal surface portion is adapted to be surface mounted to a trace on the printed circuit board adjacent the bottom metallization area of the first section. The top metal surface portion is electrically connected to the bottom metal surface portion by a first metal connector, and the top metal surface portion is further electrically connected to the top metallization area of the first section, thereby forming electrical contact between the trace on the printed circuit board and the top metallization area in contact with the second set of internal electrode plates.

In a first further embodiment of the present invention, the first and second sections are spaced from each other, and in a second further embodiment, the first and second sections form a single monolithic ceramic dielectric material, the sections being defined by a gap between the bottom metallization area of the first section and the bottom metal surface portion of the second section. Advantageously, in the first further embodiment, the top metallization area of the first section and the top metal surface portion of the second section are co-planar, and a metal connector provided over and therebetween is oriented substantially parallel to the co-planar top surface portion and top metallization area.

In another embodiment of the present invention, the ceramic dielectric body includes first and second spaced bottom exterior metallization areas each adapted to be mounted on the printed circuit board and a plurality of alternating and partially opposed interior electrode plates, the first set of plates being electrically connected to the first bottom metallization area and insulated from the second, and the second set of electrode plates being electrically connected to the second bottom metallization area and insulated from the first. The horizontal width of the first set of electrode plates are less than half the horizontal width of the ceramic dielectric body, and the alternating electrode plates partially oppose each other in an overlapping area in which the horizontal width is greater than the vertical length.

BRIEF DESCRIPTION OF THE DRAWINGS

The accompanying drawings, which are incorporated in and constitute a part of this specification, illustrate embodiments of the invention and, together with a general description of the invention given above, and the detailed description given below, serve to explain the invention.

DETAILED DESCRIPTION

Figure 3:
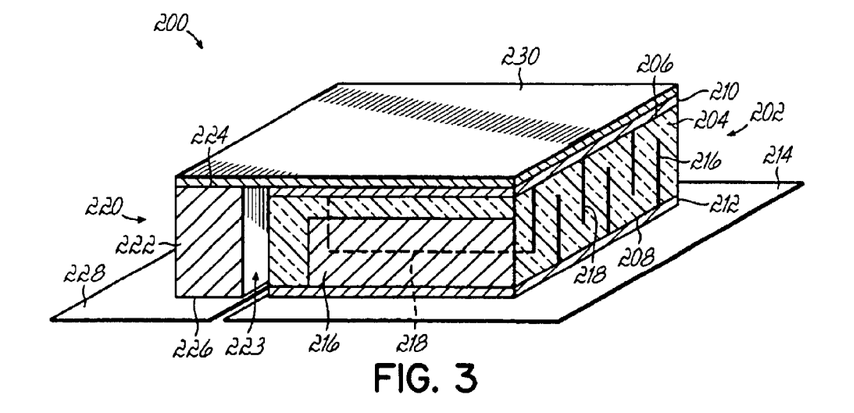
FIGS. 3, 4, 5A and 5B are each double cross-sectional perspective views of embodiments of surface mountable vertical multi-layer capacitors of the present invention.

The present invention provides a capacitor that may be used for high frequency applications, such as broadband applications, and which is fully surface mountable on a printed circuit board, thereby eliminating the need for wire bonding. Referring to FIG. 3, as described in greater detail below, the capacitor includes a plurality of alternating and partially opposed electrode plates in the interior of the ceramic dielectric body, the electrode plates being vertically oriented with respect to the printed circuit board and with respect to top and bottom opposite exterior surfaces of the ceramic dielectric body. The first set of electrode plates are in electrical contact with a bottom metallization area mounted to a surface trace on the printed circuit board such that the path length for the electrons is directly from the trace simultaneously into each electrode plate. This electron path is shorter and includes more parallel paths than the electron path for the horizontal multi-layer capacitors, such as that shown in FIG. 1, wherein the electrons travel from the surface trace up through an end termination and sequentially into the plurality of electrode plates. In the present invention, the close contact of the electrode plates to the printed circuit board contributes to a low inductance and low insertion loss at high frequency. The second set of electrode plates are in electrical contact with a top metallization area and with a second surface trace by an electron path flowing from a second bottom metallization mounted to the second surface trace through a metal connector to the top metallization area. This electron flow path eliminates the need for the wire bond, which simplifies the assembly of the printed circuit board. Lower inductance is also provided by the short and wide overlapping area of the partially opposed electrode plates.

In another embodiment of the present invention, the two sets of alternating electrode plates are in electrical contact with two respective bottom metallization areas mounted on respective surface traces, with one set of electrode plates having a horizontal width less than half the horizontal width of the dielectric body and the overlapping area of the opposing plates having a greater horizontal width than vertical length. In a further embodiment, the second electrode may be connected electrically to a top metallization. The invention may be further understood with reference to the figures in which like numerals are used to refer to like parts.

FIG. 3 depicts, in a double cross-sectional perspective view, one embodiment of a surface mountable vertical multi-layer capacitor 200 of the present invention. In this embodiment, the first section 202 comprises a ceramic dielectric body 204, which has top and bottom opposite exterior substantially parallel planar surfaces 206, 208 with top and bottom exterior metallization areas 210, 212 thereon. The bottom exterior metallization area 212 is adapted to be mounted on trace 214 of a printed circuit board (not shown). Within the ceramic dielectric material body 204 is a plurality of alternating and partially opposed first and second interior electrode plates 216, 218 that extend substantially perpendicular to the exterior parallel planar surfaces 206, 208. The first interior electrode plates 216 are in electrical contact with the bottom exterior metallization area 212, which is mounted to the surface trace 214. The first electrode plates 216 are also electrically insulated from the top metallization area 210 by the ceramic dielectric material 204. The second set of electrode plates 218 are in electrical contact with the top metallization area 210 and electrically insulated from the bottom metallization area 212. A second section 220 of the capacitor 200 is provided as a body 222 spaced from the ceramic dielectric material body 204 of the first section 202 to form a gap 223 therebetween. The body 222 of second section 220 comprises a conductive metal block including top and bottom opposite exterior substantially parallel planar surface portions 224, 226, which are metal, where the metal bottom surface portion 226 is mounted on the surface trace 228 of the printed circuit board (not shown). An electrical connection is provided between the metal top surface portion 224 and the top metallization area 210 by means of a metal connector 230 that extends over at least a portion of each, as well as over gap 223 in between. Advantageously, the metal top surface portion 224 is substantially co-planar with the top metallization area 210, and the metal connector 230 is a foil, such as a gold foil, oriented substantially parallel to the metal top planar surface portion 224 and top metallization area 210. An electron path is thus created from the surface trace 228 through the metal block 222 into the metal connector 230 to the top metallization area 210, and then into the second set of electrode plates 218.

Figure 3A:
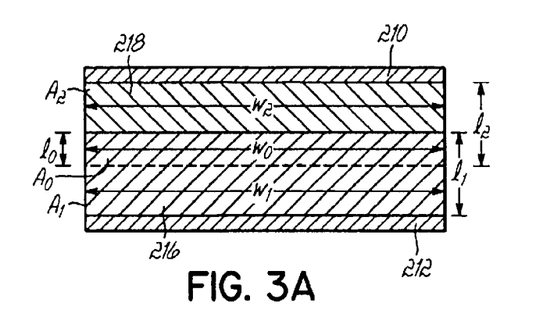
FIGS. 3A and 5C are each cross-sectional side views depicting the length, width and area dimensions for the capacitors of FIGS. 3 and 5A and 5B, respectively.

In a further preferred embodiment, the overlapping area of the first and second electrode plates 216, 218 is a short, wide area, and advantageously, the overlapping area is less than half of the cross-sectional area of sections 202 and 220 combined. Referring to FIG. 3A, which only depicts the electrode plates 216, 218 between the top and bottom metallization areas 210, 212, respectively, the first set of electrode plates 216 have a vertical length $l_1$, and a horizontal width $w_1$, the product of which forms a cross-sectional area $A_1$. Similarly, the second set of electrode plates 218 have a vertical length $l_2$ and a horizontal width $w_2$, the product of which forms a cross-sectional area $A_2$. Each first electrode plate 216 partially opposes an adjacent second electrode plate 218 in an overlapping cross-sectional area $A_0$ defined by a vertical length $l_0$ and horizontal width $w_0$. Advantageously, $w_0$ is greater than $l_0$. Also advantageously, $A_0$ is less than half the cross-sectional area of the first and second sections combined (i.e., the mathematical sum of the cross-sectional area of the first section and the cross-sectional area of the second section, as measured in a plane parallel to the electrode plates 216, 218.

Figure 4:
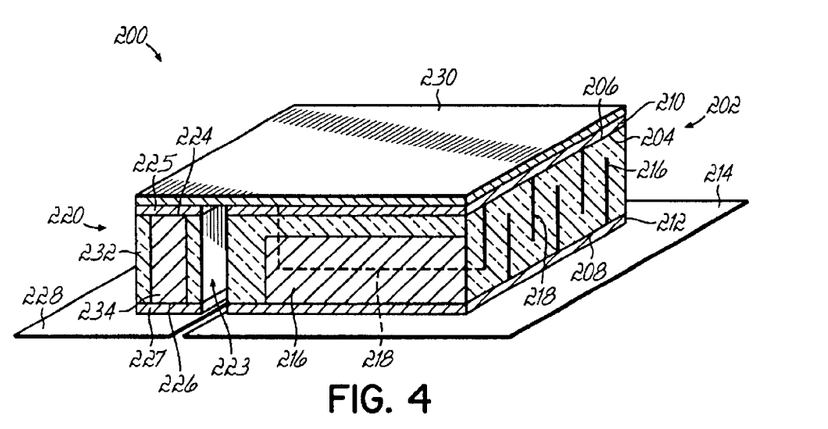

Referring to FIG. 4, another embodiment of a capacitor 200 of the present invention is shown in double cross-sectional perspective view, which embodiment is a variation of the embodiment depicted in FIG. 3. The first section 202 is identical to the section 202 in FIG. 3. The second section 220 includes a non-metallic body 232 having top and bottom exterior metal surface portions 225, 227 and an internal metal connector 234. In this embodiment, the metal surface portions 225, 227 are metallization areas formed on top and bottom opposite exterior substantially parallel planar surfaces 224, 226. The electron flow path to the second set of electrode plates 218 occurs from the surface trace 228 into the bottom metal surface portion 227 into the metal connector 234 to the top metal surface portion 225 then through the metal connector 230 into the top metallization area 210, and then into the electrode plates 218. In the embodiment of FIG. 4, the first and second sections 202, 220, could be manufactured as a single body, and subsequently split into spaced apart bodies by saw cutting or other machining methods to form gap 223.

Figure 5A:
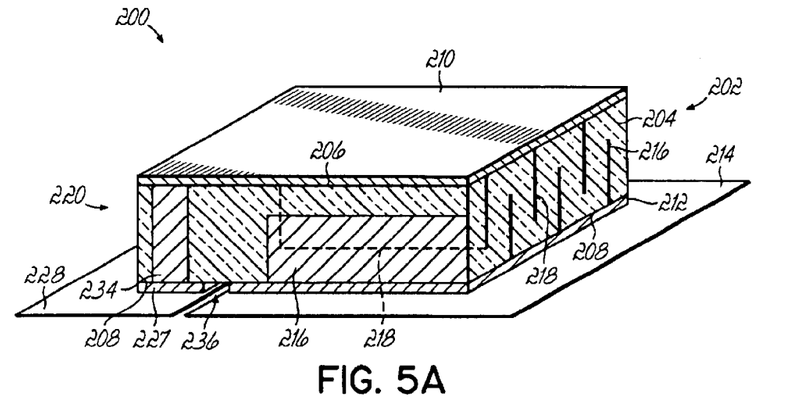
Figure 5B:
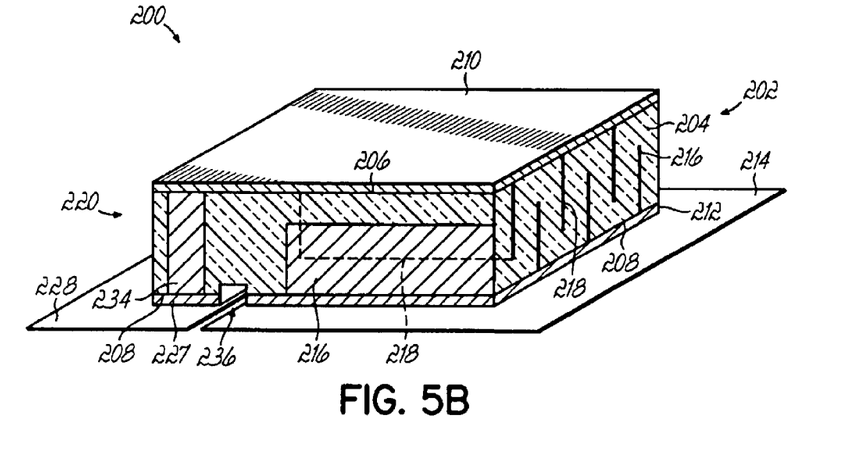
Figure 5C:
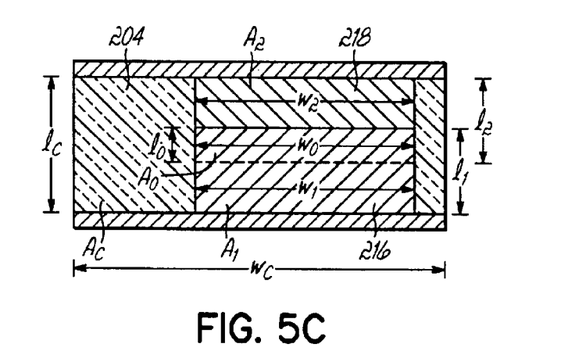

FIGS. 5A and 5B depict another embodiment of the present invention in which the first and second sections 202, 220 are part of a monolithic body of ceramic dielectric material 204, rather than the spaced apart bodies of FIGS. 3 and 4. The ceramic dielectric body 204 has top and bottom opposite exterior substantially parallel planar surfaces 206, 208. The first and second sections 202, 220 are defined by spaced first and second bottom exterior metallization areas 212, 227 formed on the bottom exterior surface 208, the metallization areas 212, 227 are adapted to be mounted on the surface traces 214, 228 of the printed circuit board (not shown). A single top exterior metallization area 210 is provided on the top exterior surface 206 over both the first and second sections 202, 220. The first section 202 includes the plurality of alternating and partially opposed first and second interior electrode plates 216, 218. As shown in FIG. 5C, the overlapping area $A_0$ is advantageously less than half the area $A_c$ of the capacitor body 204, which is defined by the product of the vertical length $l_c$ and horizontal width $w_c$. The second section 220 further includes a metal connector 234 extending internally of the ceramic dielectric material 204 and electrically connecting the section bottom metallization area 227 to the top metallization area 210. Thus, an electron flow path is created from the surface trace 228 through the bottom metallization area 227 to the metal connector 234 and into the top metallization area 210 to the second electrode plates 218. As shown in FIG. 5A, the spaced first and second bottom exterior metallization areas 212, 227 may be formed by printing the two separate areas onto the bottom exterior surface 208 leaving a gap 236 therebetween. Alternatively, as shown in FIG. 5B, a saw cut or other machining method may be used to create the gap 236. Thus, a single blanket metallization may be provided on the bottom exterior surface 208, and a saw or other machining used to cut a strip of the metallization away to break the electrical contact across the bottom surface 208 of the capacitor 200, thereby dividing the metallization into the two separate first and second bottom exterior metallization areas 212, 227. Advantageously, the saw cut will extend into the ceramic dielectric material body 204 to ensure complete separation, and thus a complete electrical break, across the bottom of the capacitor 200. The first and second sections 202, 220 are part of a monolithic body 204; therefore, the metal connector 230 is eliminated in the embodiment of FIGS. 5A and 5B because the top metallization 210 connects the two sections 202, 220. The saw cut method of forming the gap 236 shown in FIG. 5B is interchangeable with the printed gap method of forming gap 236 shown in FIG. 5A. The saw cut method provides a very specific gap, which may be advantageous for high frequency performance process repeatability, whereas the printed gap method may be advantageous for easy mass production of the capacitors 200.

Figure 6:
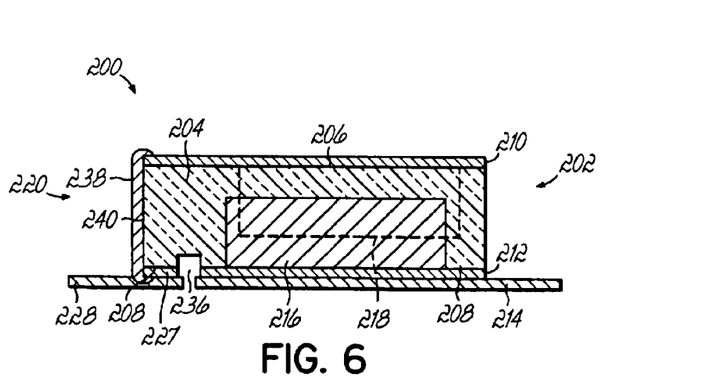
FIGS. 6, 7A and 7B are cross-sectional side views of embodiments of surface mountable vertical multi-layer capacitors of the present invention.

FIG. 6 depicts a cross-sectional side view of another embodiment of a capacitor 200 of the present invention, which is a variation of the embodiment shown in FIG. 5B. A saw cut is used to form a gap 236 that divides the ceramic dielectric material body 204 into first section 202 and second section 220. First section 202 includes bottom metallization area 212 and the alternating electrode plates 216, 218. A top metallization area 210 is provided over the top exterior surface 206 of both the first and second sections 202, 220. The bottom metallization area 212 is in electrical contact with the first set of electrode plates 216 and is mounted on the surface trace 214. The second section 220 is short circuited by a metal connector 238 formed as a coating on exterior surface 240 of ceramic dielectric body 204. The electron flow path is from surface trace 228 through bottom metallization area 227 to the metal connector 238 and into top metallization area 210 to the second electrode plates 218. This electron path is the same as in the embodiments of FIGS. 5A and 5B except that metal connector 238 is exterior of the ceramic dielectric material body rather than the interior metal connector 234. The metal connector 238 may be formed by dipping the capacitor 200 in a metal bath, or by any other coating methods now known or hereafter developed. While gap 236 is shown as a saw cut into the dielectric body 204, the printing gap method of FIG. 5A may also be used in this embodiment.

Figure 7A:
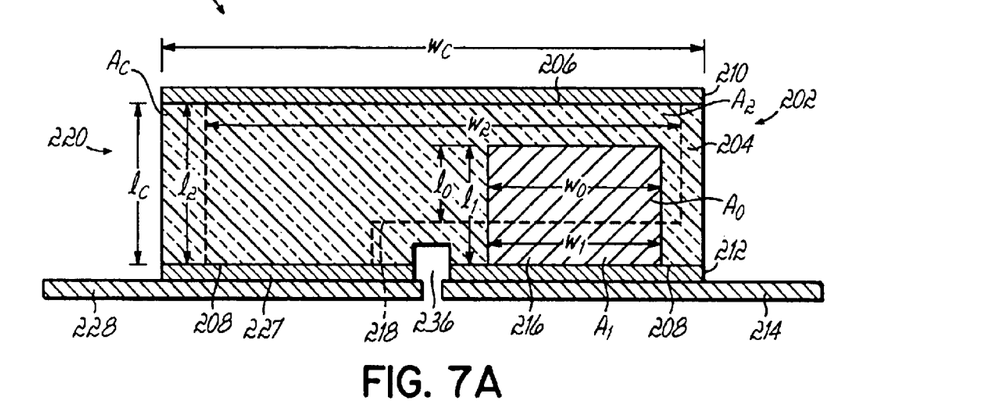
Figure 7B:
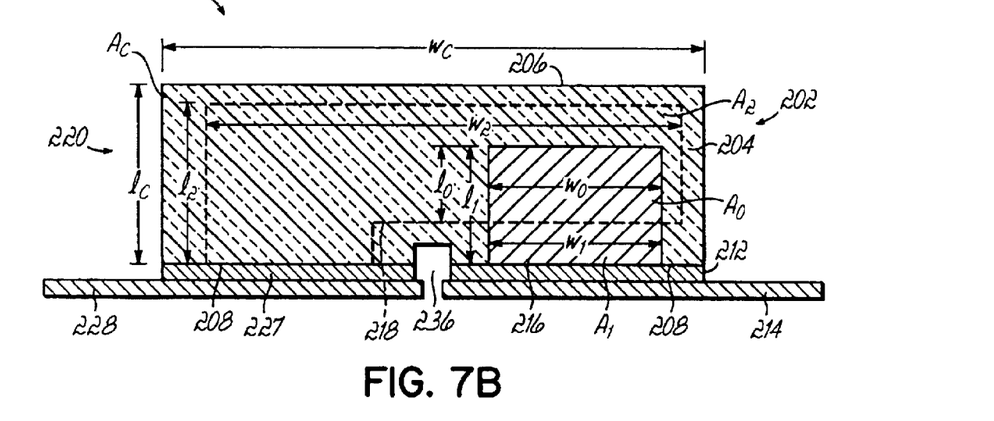

FIGS. 7A and 7B depict another embodiment of a capacitor 200 of the present invention for providing a surface mountable vertical multi-layer capacitor 200 having short wide overlapping electrode plates to provide low inductance. In the embodiment shown in FIG. 7A in cross-sectional side plan view, a monolithic ceramic dielectric body 204 is provided having a gap 236 therein to divide the body 204 into first section 202 and second section 220. The first section 202 is provided with a plurality of first electrode plates 216 having a horizontal width $w_1$ that is less than half the horizontal width $w_c$ of the ceramic dielectric body 204. Also advantageously, the area $A_1$ is less than half the area $A_c$ of the ceramic dielectric body 204. The first bottom metallization area 212 provides electrical contact between the first electrode plates 216 and surface trace 214. The second section 220 includes the second set of electrode plates 218 in electrical contact with surface trace 228 through a second bottom metallization area 227, and the electrode plates 218 are shorted by further electrical contact with top metallization area 210. As with the embodiment of FIGS. 5A, 5B and 6, bottom metallization areas 212, 227 may be formed on bottom exterior surface 208 by the printed gap method, by saw cutting, or by any other appropriate now known or hereafter developed method. The second electrode plates 218 also extend into the first section 202 to partially oppose the first electrode plates 216 to provide an overlapping area $A_0$ in which the overlapping horizontal width $w_0$ is greater than the overlapping vertical length $l_0$. The embodiment depicted in FIG. 7B is similar to that shown in FIG. 7A, except that the second electrode plates 218 are not shorted by eliminating the top metallization area 210. The vertical length $l_2$ of the second electrode plates 218 may be shorter since the electrode plates need not extend to the top exterior planar surface 206. By minimizing the overlapping area $A_0$ in the embodiments of FIGS. 7A and 7B, a low inductance is provided to enable better performance of the capacitor 200 in high frequency applications.

The conductive metal may be Au, Ag, $AgNO_3$ or $AgCO_3$, for example. Alternatively, Cu, Ni and alloys thereof may be used, but these metals will generally require a reducing atmosphere. Pd, Pt and alloys thereof may also be used, but these metals are generally more expensive than Ag-based systems. Thick-film gold is advantageous, particularly for the top and bottom metallizations, because of its high conductivity, but gold is also more expensive than Ag-based systems. Thick-film silver covered with nickel plating and then gold plating may be used to obtain the benefits of gold at lower cost. Advantageously, the ceramic material is an ultra-low firing ceramic, for example, one that fires around 900° C. An exemplary ceramic is a $BaTiO_3$ based ceramic. The metals generally used for the conductive metal portion of the composite generally sinter around 800° C. such that the ultra-low firing ceramic materials will be most compatible with the metal portion. In one embodiment of the present invention, the ceramic dielectric material is a high K (dielectric constant) ceramic, such as X7R or Y5V, to provide high capacitor values for broadband filtering. Alternatively, the ceramic dielectric material may be a low K material, such as NPO, for low pF capacitance value coupling capacitors, which typically have values of 0.1 pF–100 pF.

While the present invention has been illustrated by the description of one or more embodiments thereof, and while the embodiments have been described in considerable detail, they are not intended to restrict or in any way limit the scope of the appended claims to such detail. Additional advantages and modifications will readily appear to those skilled in the art. For example, while the exemplary embodiments of FIGS. 3–7B are shown and described as having first and second sections with top and bottom opposite exterior substantially parallel planar surfaces, the invention is not limited to substantially parallel and/or planar exterior opposing surfaces. Rather, the exterior surfaces may be merely generally opposed. By way of further example, while the width of the electrode plates is depicted to extend along the x-axis, it may be understood the electrode plate orientation is not so limited. For example, the width of electrode plates may extend along the z-axis. The invention in its broader aspects is therefore not limited to the specific details, representative apparatus and illustrative examples shown and described. Accordingly, departures may be made from such details without departing from the scope or spirit of the general inventive concept.

What is claimed is:

1. A surface mountable, vertical multi-layer capacitor comprising a first section and a second section, wherein the first section comprises a ceramic dielectric material having top and bottom opposite exterior surfaces and respective top and bottom metallization areas thereon, with the bottom metallization area adapted to be mounted on a printed circuit board, and a plurality of alternating and partially opposed first and second interior electrode plates extending between the exterior surfaces, the first electrode plates in electrical contact with the bottom metallization area and electrically insulated from the top metallization area by the ceramic dielectric and the second electrode plates in electrical contact with the top metallization area and electrically insulated from the bottom metallization area by the ceramic dielectric, and wherein the second section comprises a body having top and bottom opposite exterior surfaces and respective top and bottom metal surface portions electrically connected therebetween by a first metal connector, the top metal surface portion being electrically connected to the top metallization area of the first section, and the bottom metal surface portion adapted to be mounted on said printed circuit board.

2. The capacitor of claim 1 wherein the second section is spaced from the first section, and wherein the top metal surface portion is electrically connected to the top metallization area by a second metal connector extending over at least a portion of each of the top metal surface portion and the top metallization area and therebetween.

3. The capacitor of claim 2 wherein the top metal surface portion is substantially coplanar with the top metallization area.

4. The capacitor of claim 3 wherein the second metal connector is a gold foil oriented substantially parallel to each of the top metallization areas and the top metal surface portion.

5. The capacitor of claim 2 wherein the second section is a metal block which forms the body, the top and bottom metal surface portions and the first metal connector.

6. The capacitor of claim 2 wherein the body of the second section is non-metallic and the first metal connector is an internal metal plate extending from the top metal surface portion to the bottom metal surface portion.

7. The capacitor of claim 2 wherein the body of the second section is non-metallic and the first metal connector is an external metal coating extending from the top metal surface portion to the bottom metal surface portion.

8. The capacitor of claim 1 wherein the body of the second section comprises the ceramic dielectric material and is monolithic with the first section, the first and second sections defined by a gap between the bottom metal surface portion and the bottom metallization area.

9. The capacitor of claim 8 wherein the gap is formed by a saw cut formed through a single bottom blanket metallization formed on the bottom parallel planar surfaces of the first and second sections, the saw cut extending into the ceramic dielectric material to thereby separate the bottom blanket metallization into the bottom metal surface portion and the bottom metallization area.

10. The capacitor of claim 8 wherein a single top blanket metallization forms the top metallization area and the top metal surface portion.

11. The capacitor of claim 8 wherein the first metal connector is an internal metal plate extending from the top metal surface portion to the bottom metal surface portion.

12. The capacitor of claim 8 wherein the first metal connector is an external metal coating extending from the top metal surface portion to the bottom metal surface portion.

13. The capacitor of claim 1 wherein the first electrode plates each have a first cross-sectional area and the second electrode plates each have a second cross-sectional area, and wherein each first electrode plate partially opposes an adjacent second electrode plate in an overlapping third cross-sectional area in which the horizontal width is greater than the vertical length.

14. The capacitor of claim 1 wherein the first electrode plates each have a first cross-sectional area and the second electrode plates each have a second cross-sectional area, and wherein each first electrode plate partially opposes an adjacent second electrode plate in an overlapping third cross-sectional area that is less than half of the sum of the cross-sectional areas of the first and second sections.

15. The capacitor of claim 14 wherein the overlapping third cross-sectional area is greater in horizontal width than vertical length.

16. A surface mountable, vertical multi-layer capacitor comprising:

a first body comprising a ceramic dielectric material and having top and bottom opposite exterior surfaces;

top and bottom exterior metallization areas on the respective top and bottom exterior surfaces, wherein the bottom exterior metallization area is adapted to be mounted on a printed circuit board;

a plurality of alternating and partially opposed first and second interior electrode plates within the first body extending between the exterior surfaces, the first electrode plates in electrical contact with the bottom exterior metallization area and electrically insulated from the top exterior metallization area by the ceramic dielectric material and the second electrode plates in electrical contact with the top exterior metallization area and electrically insulated from the bottom exterior metallization area by the ceramic dielectric material;

a second body spaced from the first body and having top and bottom opposite exterior metal surface portions, wherein the bottom exterior metal surface portion is adapted to be mounted on said printed circuit board, and wherein the second body further comprises a first metal connector electrically connecting the top and bottom exterior surface portions; and a second metal connector extending from the top exterior metallization area of the first body to the top exterior metal surface portion of the second body to form an electrical connection therebetween.

17. The capacitor of claim 16 wherein the top metal surface portion is substantially coplanar with the top metallization area.

18. The capacitor of claim 17 wherein the second metal connector is a gold foil oriented substantially parallel to each of the tops metallization areas and the top metal surface portion.

19. The capacitor of claim 16 wherein the second body is a metal block which includes the top and bottom metal surface portions and the first metal connector.

20. The capacitor of claim 16 wherein the second body is non-metallic and the first metal connector is an internal metal plate extending from the top metal surface portion to the bottom metal surface portion.

21. The capacitor of claim 16 wherein the second body is non-metallic and the first metal connector is an external metal coating extending from the top metal surface portion to the bottom metal surface portion.

22. The capacitor of claim 16 wherein the first electrode plates each have a first cross-sectional area and the second electrode plates each have a second cross-sectional area, and wherein each first electrode plate partially opposes an adjacent second electrode plate in an overlapping third cross-sectional area in which the horizontal width is greater than the vertical length.

23. The capacitor of claim 16 wherein the first electrode plates each have a first cross-sectional area and the second electrode plates each have a second cross-sectional area, and wherein each first electrode plate partially opposes an adjacent second electrode plate in an overlapping third cross-sectional area that is less than half of the sum the cross-sectional areas of the first and second sections.

24. The capacitor of claim 23 wherein the overlapping third cross-sectional area is greater in horizontal width than vertical length.

25. A surface mountable, vertical multi-layer capacitor comprising:

a ceramic dielectric body having top and bottom opposite exterior surfaces;

spaced first and second bottom exterior metallization areas on the respective bottom exterior surface, wherein the first and second bottom exterior metallization areas are adapted to be mounted on a printed circuit board;

a top exterior metallization area on the respective top exterior surface;

a plurality of alternating and partially opposed first and second interior electrode plates within the ceramic dielectric body extending between the exterior surfaces, the first electrode plates in electrical contact with the first bottom exterior metallization area and electrically insulated from the top exterior metallization area and the second bottom exterior metallization area by the ceramic dielectric and the second electrode plates in electrical contact with the top exterior metallization area and electrically insulated from the first and second bottom metallization areas by the ceramic dielectric; and a metal connector extending from the second bottom exterior metallization area to the top exterior metallization area to form an electrical connection therebetween.

26. The capacitor of claim 25 wherein the first and second bottom exterior metallization areas are spaced by a gap formed by a saw cut through a single bottom blanket metallization formed on the bottom exterior surface of the ceramic dielectric body, the saw cut extending into the ceramic dielectric body to thereby separate the bottom blanket metallization into the first and second bottom metallization areas.

27. The capacitor of claim 25 wherein the metal connector is an internal metal plate.

28. The capacitor of claim 25 wherein the metal connector is an external metal coating.

29. The capacitor of claim 25 wherein the first electrode plates each have a first cross-sectional area and the second electrode plates each have a second cross-sectional area, and wherein each first electrode plate partially opposes an adjacent second electrode plate in an overlapping third cross-sectional area in which the horizontal width is greater than the vertical length.

30. The capacitor of claim 25 wherein the first electrode plates each have a first cross-sectional area and the second electrode plates each have a second cross-sectional area, and wherein each first electrode plate partially opposes an adjacent second electrode plate in an overlapping third cross-sectional area that is less than half the cross-sectional area of the ceramic dielectric body.

31. The capacitor of claim 30 wherein the overlapping third cross-sectional area is greater in horizontal width than vertical length.

32. A surface mountable, vertical multi-layer capacitor comprising:

a ceramic dielectric body having top and bottom opposite exterior surfaces and a cross-sectional area defined by a vertical length and horizontal width in a plane substantially perpendicular to the exterior surfaces;

spaced first and second bottom exterior metallization areas on the respective bottom exterior surface, wherein the first and second bottom exterior metallization areas are adapted to be mounted on a printed circuit board;

a plurality of alternating and partially opposed first and second interior electrode plates within the ceramic dielectric body extending between the exterior surfaces, the first electrode plates in electrical contact with the first bottom exterior metallization area and electrically insulated from the second bottom exterior metallization area by the ceramic dielectric, and the second electrode plates in electrical contact with the second bottom exterior metallization area and electrically insulated from the first bottom exterior metallization area by the ceramic dielectric; and wherein the ceramic dielectric body and the first and second electrode plates each have a cross-sectional area defined by a vertical length and a horizontal width in a plane substantially perpendicular to the exterior surfaces, and wherein the horizontal widths of the first electrode plates are less than half the horizontal width of the ceramic dielectric body, and wherein each first electrode plate partially opposes an adjacent second electrode plate in an overlapping cross-sectional area defined by an overlapping vertical length and an overlapping horizontal width in which the overlapping horizontal width is greater than the overlapping vertical length.

33. The capacitor of claim 32 further comprising a top exterior metallization area on the respective top exterior surface, wherein the second electrode plates are in electrical contact with the top exterior metallization area, and the first electrode plates are electrically insulated from the top exterior metallization area.

34. The capacitor of claim 33 wherein the first and second bottom exterior metallization areas are spaced by a gap formed by a saw cut through a single bottom blanket metallization formed on the bottom exterior surface of the ceramic dielectric body, the saw cut extending into the ceramic dielectric body to thereby separate the bottom blanket metallization into the first and second bottom metallization areas.

35. The capacitor of claim 32 wherein the overlapping cross-sectional area is less than half the cross-sectional area of the ceramic dielectric body.

* * * * *

UNITED STATES PATENT AND TRADEMARK OFFICE
CERTIFICATE OF CORRECTION

PATENT NO. : 6,831,824 B1
DATED : December 14, 2004
INVENTOR(S) : Devoe et al.

It is certified that error appears in the above-identified patent and that said Letters Patent is hereby corrected as shown below:

Column 1,
Line 12, "from low frequency." should read -- from low frequency to high frenquency. --.
Line 15, "for frequency" should read -- for high frequency --.

Column 2,
Line 48, "plates are less" should read -- plates is less --.

Column 4,
Line 45, "plates 216, 218." should read -- plates 216, 218). --.

Column 9,
Line 13, "the tops metallization" should read -- the top metallization --.
Line 38, "sum the cross-" should read -- sum of the cross- --.

Signed and Sealed this

Twenty-fourth Day of May, 2005

JON W. DUDAS
*Director of the United States Patent and Trademark Office*